Aug. 15, 1944.　　P. NAEHER ET AL　　2,355,670
APPARATUS FOR TREATING WHEAT GERMS
Filed Aug. 13, 1941　　5 Sheets-Sheet 2

Inventors.
Paul Naeher.
Maurice T. Williams,
by Parker T Carter
Attorneys.

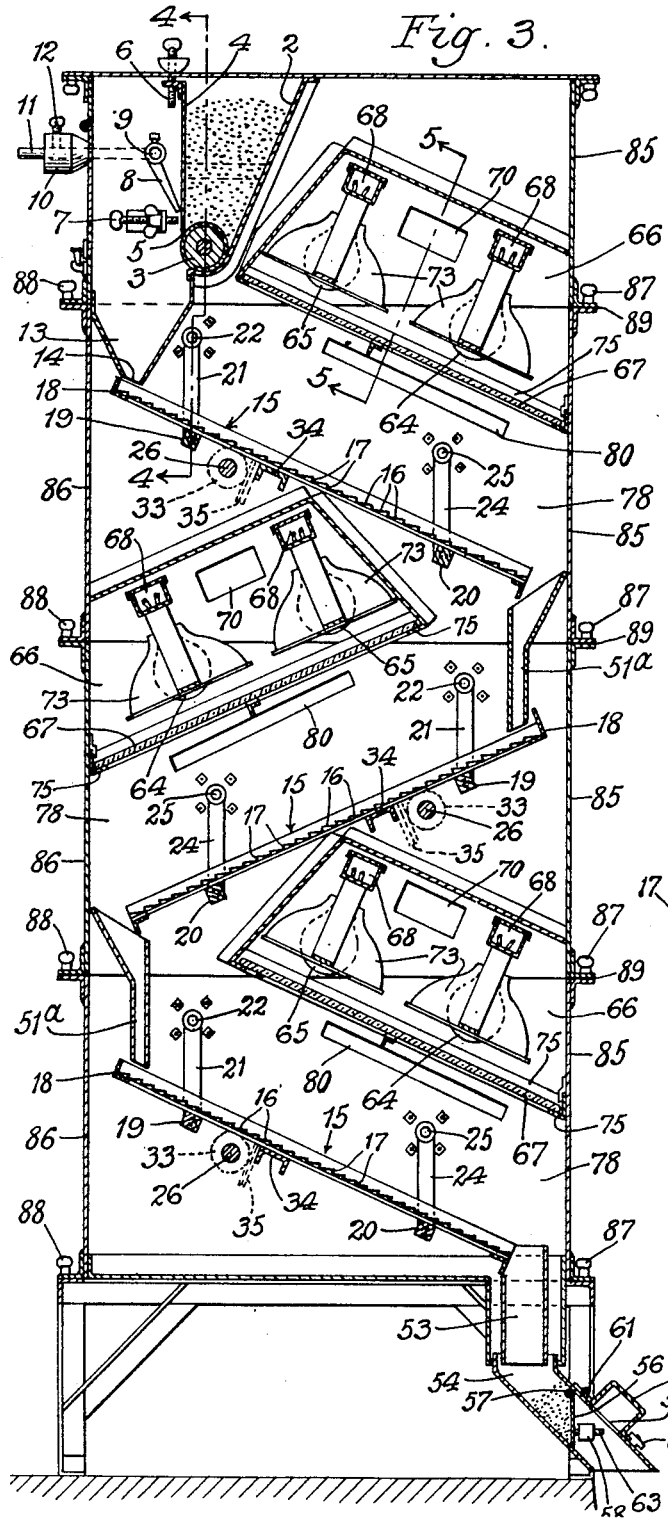
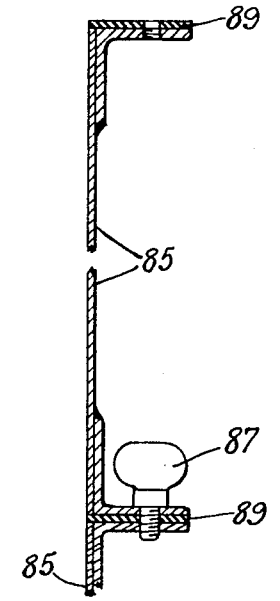
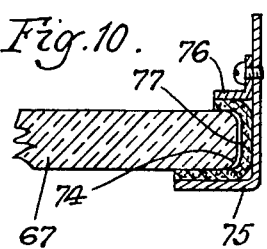

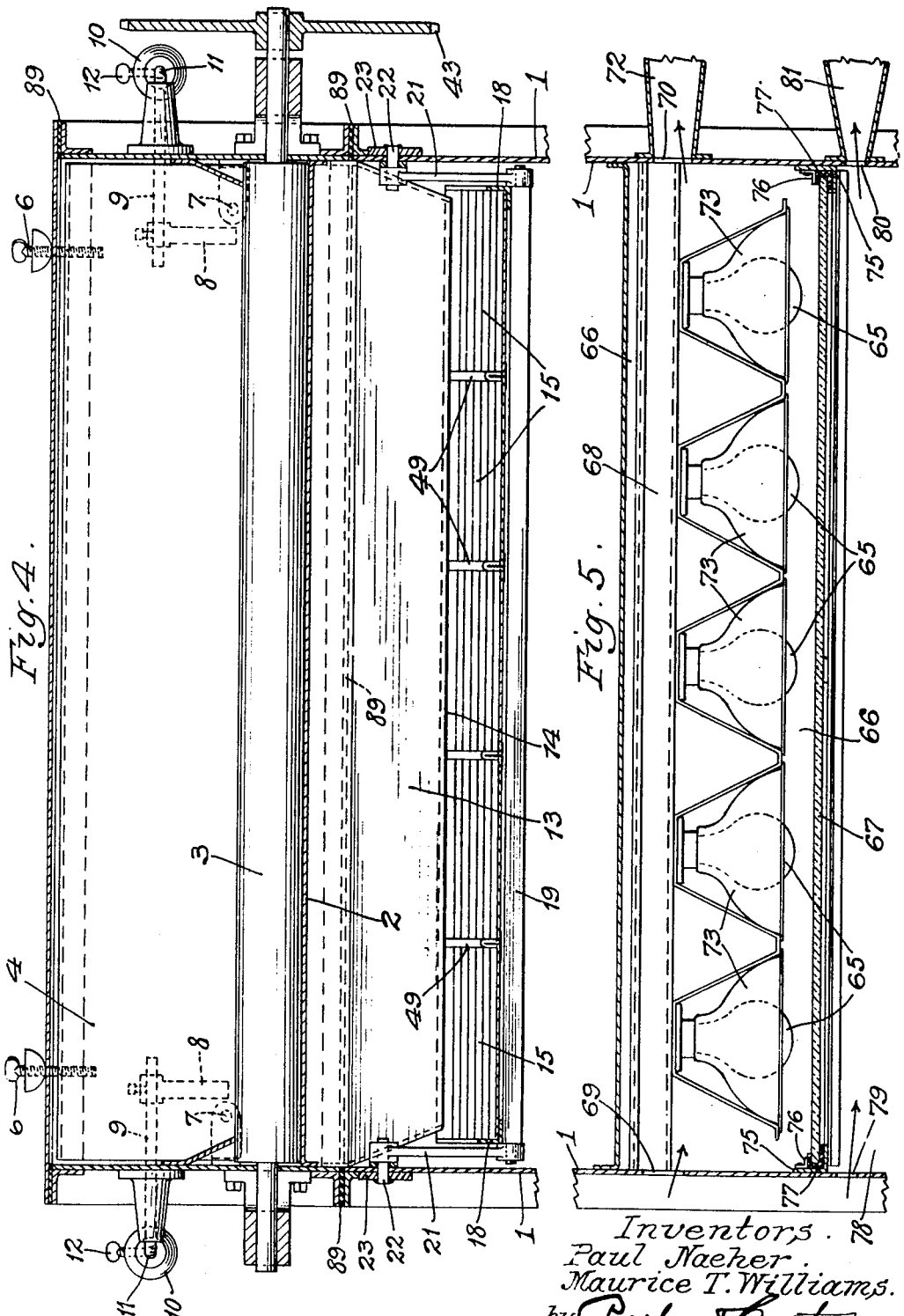

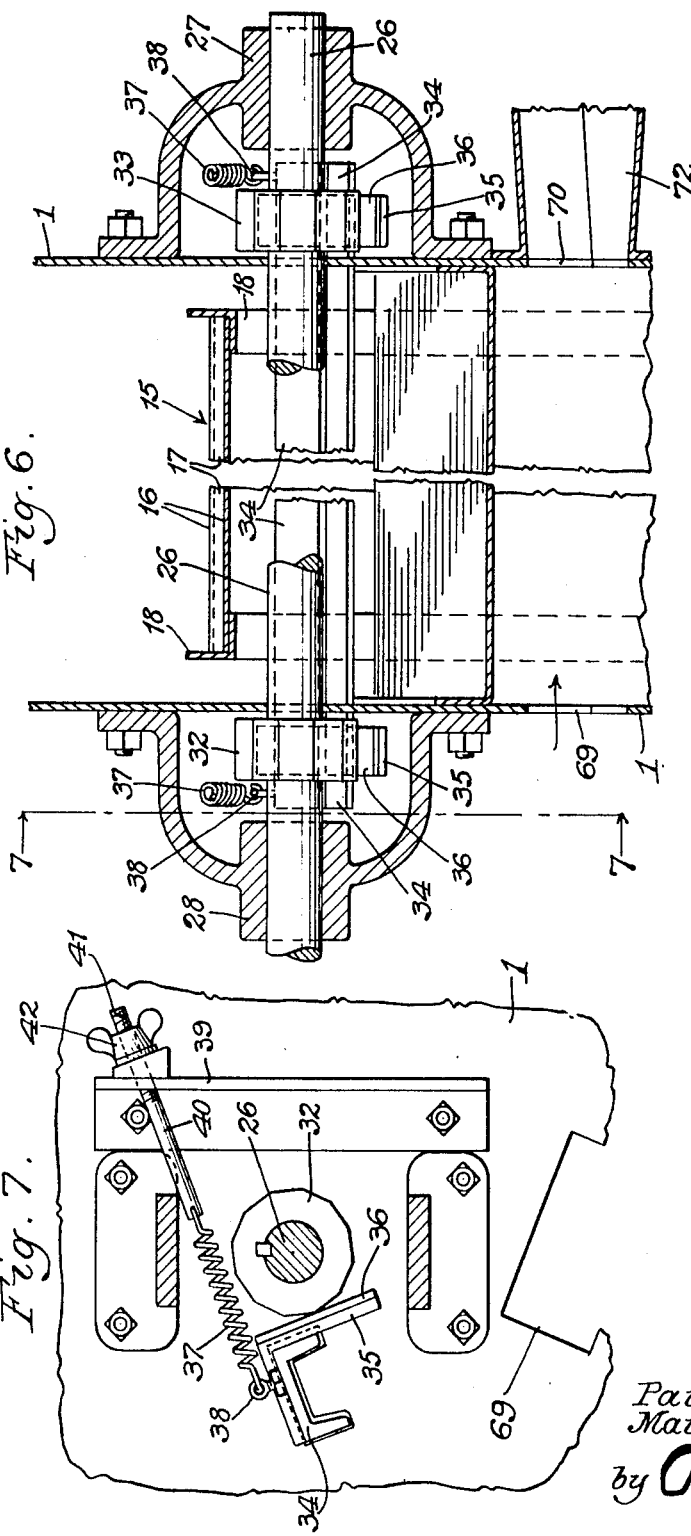

UNITED STATES PATENT OFFICE 2,355,670

APPARATUS FOR TREATING WHEAT GERMS

Paul Naeher, Evanston, and Maurice T. Williams, Oak Park, Ill., assignors to B. F. Gump Co., Chicago, Ill., a corporation of Illinois Application August 13, 1941, Serial No. 406,662

4 Claims. (Cl. 34—164)

This invention relates to an apparatus for treating the germs of wheat and has for its purpose to provide a new and improved apparatus for this purpose.

The invention has as a further object to provide an apparatus for treating germs of wheat by the use of infra-red rays. In making flour from wheat, it has heretofore been the practice to remove the wheat germs. These wheat germs contain oil and the particles adhere. Heretofore these germs have been removed by running the material containing them, such as the germ middlings, through rollers, whereupon the germs flatten out instead of becoming pulverized, and are then removed by running the material through a sieve. The flat germs, being larger than the pulverized material, do not pass through the sieve and are then easily removed. One of the objects of the present invention is to treat these germs so that they can be readily pulverized and become a part of the flour, as they contain vitamins and mineral elements vitally important for the diet of human beings.

The invention has as a further object to provide an apparatus for treating germs of wheat by infra-red rays and for removing the moisture from the oil therein while being treated.

The invention has as a further object to provide an apparatus for treating wheat germs while in the middlings by infra-red rays and for removing the dust while the middlings are being treated.

The invention has as a further object to provide an apparatus for treating the wheat germs while they form a part of middlings of crushed wheat by successively passing these middlings past infra-red lamps and vibrating them while they are passing the lamps.

The invention has as a further object to provide an apparatus for treating the germs in germ middlings so that they will pulverize and not flake in the grinding operation of reducing the product to flour.

The invention has as a further object to treat germs of wheat which are to become part of the flour by removing moisture from the oil therein to prevent them from becoming rancid.

The invention has as a further object to provide an apparatus for treating germ middlings by continuously passing the germ middlings under a series of infra-red lamps in an enclosing device having means for removing heat therefrom, and agitating the germ middlings during this passage and removing the moisture and the dust at points separate from the point where the treated germ middlings are discharged.

The invention has other objects which are more particularly pointed out in the accompanying description.

Referring now to the drawings:

Fig. 3 is a sectional view taken on line 3—3 of Fig. 1;

Fig. 4 is a sectional view taken on line 4—4 of Fig. 3;

Fig. 5 is a sectional view taken on line 5—5 of Fig. 3;

Fig. 6 is a sectional view taken on line 6—6 of Fig. 2;

Fig.7 is a sectional view taken on line 7—7 of Fig. 6;

Fig. 8 is a sectional view through one of the removable inspection doors;

Fig. 9 is a detailed sectional view of one of the joints between the corrugated plates on the vibrating members;

Fig. 10 is a sectional view showing the end of the glass member located in position.

Like numerals refer to like parts throughout the several figures.

Figure 1:
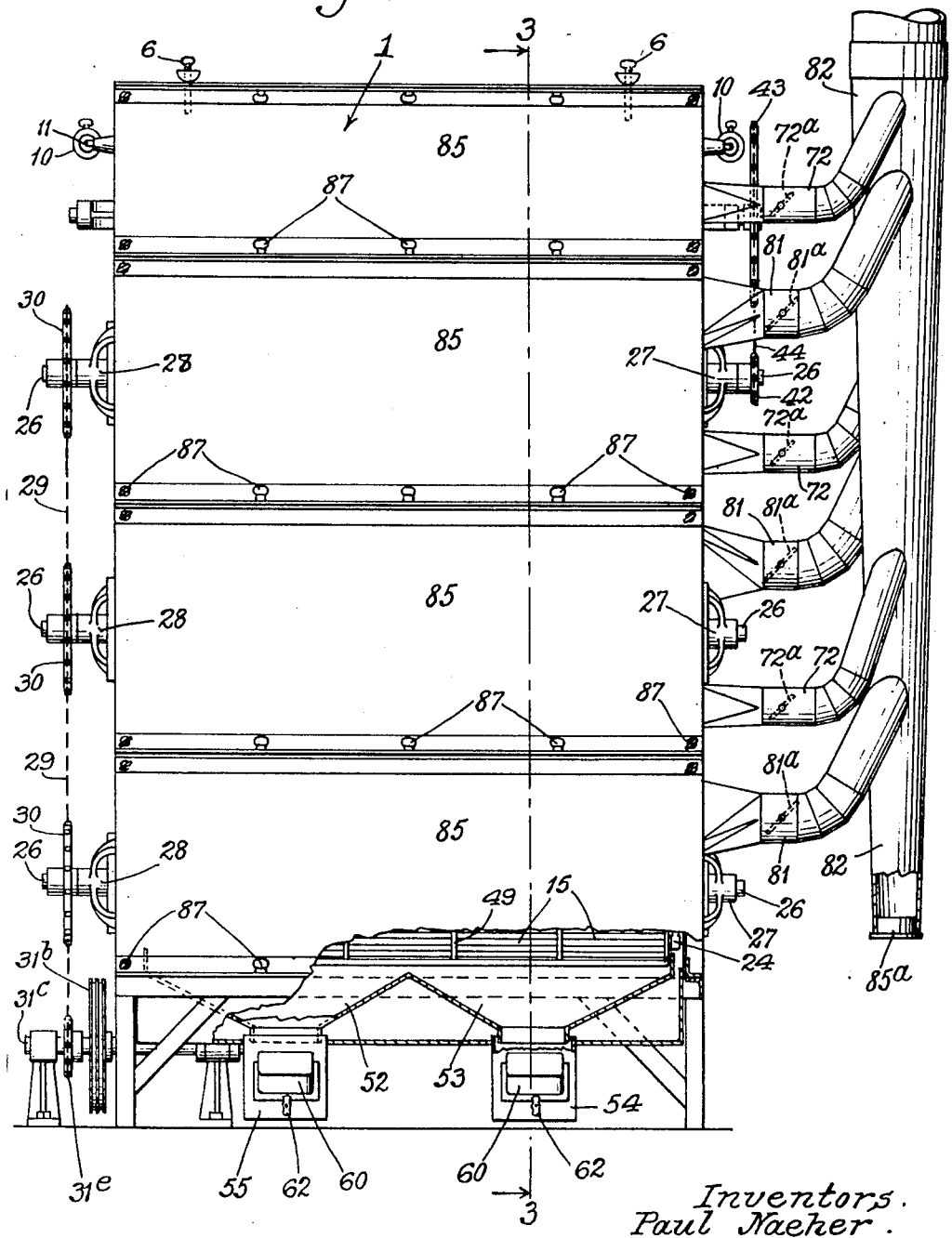
Fig. 1 is a front elevation of one form of apparatus for carrying out the method with parts shown in section.

For purpose of illustration, we have shown one form of apparatus for treating germ middlings. This apparatus comprises a housing 1 containing the various devices for acting upon the germ middlings. These germ middlings are separated from the remainder of the crushed wheat and then are passed through this housing. The germ middlings are placed in a hopper 2 at the top of the housing, which is provided at the bottom with a feed roll 3. One wall 4 of the hopper (see Fig. 3) is made to form a feed adjusting member by means of which the feed opening 5 between the member 4 and the roll 3 may be adjusted. The feed adjusting member is moved up or down by means of an adjusting screw 6 so as to vary the size of the feed opening. It is also movable laterally to adjust the size of the feed opening, its lateral movement being limited by the adjustable stop 7.

The wall 4 is pressed toward or against the feed roll 3 by one or more arms 8 mounted on a shaft 9 which has a weight 10 connected therewith by means of an arm 11. This weight is adjustably mounted on the arm 11 by the adjusting screw 12. The material discharged from the hopper 2 passes into a second hopper 13 which has a discharge mouth 14. The hopper 2 and the hopper 13 and discharge mouth 14 preferably extend entirely across the housing.

The germ middlings are discharged in the proper amount from the hopper 13 onto a corrugated vibrating or agitating member 15 which is inclined downwardly from the top or admission end toward the discharge end. There are a plurality of the vibrating or agitating members 15 to which the germ middlings are successively delivered, all of which are similar and all of which are moved or vibrated by similar parts. Since a description of one of these agitating members and associated parts constitutes a description of all of them, we have described one and applied the reference numerals to all of them. For purposes of illustration, we have shown three of these agitating members but any desired number may be used. These vibrating or agitating members are preferably made of corrugated metal, that is metal having a series of projecting ribs 16 thereon separated by depressions 17. These agitating members are movably mounted in position in any desired manner.

As herein shown, each agitating member is connected to a frame 18 which has beneath it the longitudinal members 19 and 20 which are indicated as bars having rounded ends. The links 21 are mounted upon the rounded ends of the member 19, there being one link at each side of the housing, as shown for example in Fig. 4. These links 21 are mounted upon pins 22 fastened in position in any desired manner, as for example by projecting through the housing and through the members 23 attached to the housing. There are attached to the rounded ends of the member 20 the links 24, one at each side of the housing, and these links are mounted upon pins 25 similar to the pins 22, and supported in a similar manner. The links 21 and 24 have a rocking connection with the members 19 and 20 and the pins 22 and 25 as the agitating members 15 are moved, to cause the germ middlings to travel therealong. Some suitable means is provided for vibrating the agitating members 15.

As herein shown, there is provided under each agitating member, and extending therealong, a shaft 26 which extends through the housing and which is mounted in bearings 27 and 28 attached to the outside of the housing (Fig. 6) and which is rotated in any desired manner, as by means of a belt 29 passing over sprocket wheels 30 and driven by a motor 31. The shaft of the motor is connected by a belt 31a with a pulley 31b on a shaft 31c which is provided with a sprocket wheel 31e over which the belt 29 passes. Each shaft 26 is provided with two flat faced wheels 32 and 33 keyed thereto (see Figs. 3 and 6), which are preferably on the outside of the housing. Attached to each agitating member is a longitudinally extending member 34 which has at each end opposite the flat faced wheels 32 and 33 the engaging members 35, preferably provided with a face 36 of some material such as rawhide. The ends of the members 34 extend through enlarged openings in the housing. When the flat faced wheels are rotated the flat faces engage the engaging members 35, that is the rawhide face thereof and move or vibrate the agitating members.

There are springs 37 connected with the members 34 at each end in proximity to the flat faced wheels 32 and 33 (see Figs. 6 and 7) which maintain the engaging devices 35 in contact with the flat faced wheels. The wheels move the agitating members in one direction and the springs 37 move them back in the other direction. These springs 37 have one end fastened to the members 34 by the fastening devices 38 and the other ends fastened to fixed parts 39 of the housing. As herein shown, each spring is connected with a rigid member 40 which has a screw threaded end 41, there being an adjusting nut 42 on the screw threaded end so that the tension of the spring may be adjusted (Fig. 7) as desired.

The feed roll 3, as herein shown, is driven from the shaft 26 of the upper agitating member. This shaft (see Figs. 1 and 2) has a sprocket wheel 42a on the end opposite to that provided with the sprocket wheel 30. There is a sprocket wheel 43 connected with the shaft of the feed roll 3 and there is a belt 44 connecting these two sprocket wheels so that when the shaft 26 is rotated, the feed roll is rotated.

As the material passes along the agitating members, it is heated, preferably by a series of infra-red lamps. The agitating members are made of metal and are heated by these lamps and, in order to prevent them from getting out of shape, they are made in a number of sections. In the construction herein shown, each of the corrugated metal portions of the agitating members is made in five sections (Fig. 4). These sections may be arranged in any desired manner, but we prefer to have their edges connected together. In Fig. 9 we have shown one connecting means. In this construction there are two angle irons having two members 45 and 46 which engage the lower face of the abutting sections. The other members of these angle irons 47 and 48 project up between the edges of the two sections. A U-shaped connecting member 49 fits down over the parts 47 and 48. There is a fire-resisting packing 50 interposed between the U-shaped connecting member 49 and the parts 47 and 48. The parts are all fastened together by the fastening devices 51. The fire-resisting packing fits tightly against the upper corrugated surface engaging the surface of the ribs and also the surface of the depressions so that there can be no leakage of the material, either from one section to the other or downwardly from the sections.

As the agitating members are vibrated, the material passes therealong and is conveyed from one agitating member to another by the connecting conveying members 51a. The material from the last or bottom agitating member is discharged into two hoppers 52 and 53 and is discharged by these hoppers into the spouts 54 and 55, and passes from these spouts into any suitable storage device desired. Each of these spouts is provided with a hinged door 56 which is hinged at 57 and which normally extends across the spouts (Fig. 3). Attached to the rear of each of these doors is an adjusting weight 58. Each spout is provided with an opening 59, each of which is covered by a hinged receptacle 60, hinged at 61, and which has a fastening member 62 at the opposite side. The receptacles 60 provide spaces into which the weights 58 and the adjusting screws 63, upon which they are mounted, may be received as the doors open. By loosening the fastening devices 62, the receptacles 60 may be moved about their hinges so as to give access to the weights for adjustment purposes.

The material only passes these doors when there is enough material above the doors, the weight of which is sufficient to overcome the resistance of the weights 58. The doors are then opened to let some of this material pass out. When the amount of material above the doors is reduced so that the weight thereof is not sufficient to overcome the weights 58 these weights cause the doors to close. It will be seen that by this arrangement the doors when closed and the material above the doors, when the doors are open, prevent air from passing up through these spouts into the housing.

The material as it passes along the agitating members 15 is subjected to the light and heat of a series of electric infra-red lamps. These lamps may be arranged in any desired manner capable of securing the result. As herein shown, there is associated with each agitating member 15 a plurality of infra-red lamps preferably arranged to direct the rays directly down upon the material passing along the agitating members. In the particular construction shown, each agitating member is provided with two rows of lamps 64 and 65. These lamps are enclosed in a closed receptacle 66, the bottom of which is formed of glass or other suitable ray transmitting member 67 of the type which does not greatly impede the infra-red rays of the lamp. The remaining portion of the receptacle may be formed in any desired manner, as by means of sheet metal fastened in position to the walls of the housing. The electric wires for the lamps preferably pass to each row of lamps through separate conduits 68 (see Figs. 3 and 5). As these lamps develop considerable heat, some means is provided for removing this heat. Each of these receptacles 66 has an air admission opening 69 at one side of the housing and an air discharge opening 70 at the other side of the housing, which openings connect with the space in which the lamps are located. Each of the openings 70 connects with an exhaust conduit 72 (Fig. 1), which is connected to some suitable exhaust or air-moving device so that the heat can be withdrawn from the lamp receptacles.

Each of the lamps is provided with a reflector 73 which directs the rays through the glass member 67 onto the material passing along the agitating member 15. This glass member is preferably provided with rounded corners 74 (Fig. 10), which tends to eliminate cracking of the glass, and is held in place in any desired manner. As herein shown, there is at each edge a holding member 75 with a clamping member 76 attached thereto. There is preferably an asbestos or other fire-resistant air tight packing 77 surrounding the edge of the glass so as to provide a tight fit to the glass in its supporting means.

When the material is subjected to the infra-red lamps, it is dried, moisture being liberated therefrom and passing into the chambers 78, also the material is somewhat dusty and dust is produced by the friction of the material as it passes along the corrugated agitating member. This dust must be removed or otherwise it will settle on the glass member 67 and interfere with the action of the lamps.

Figure 2:
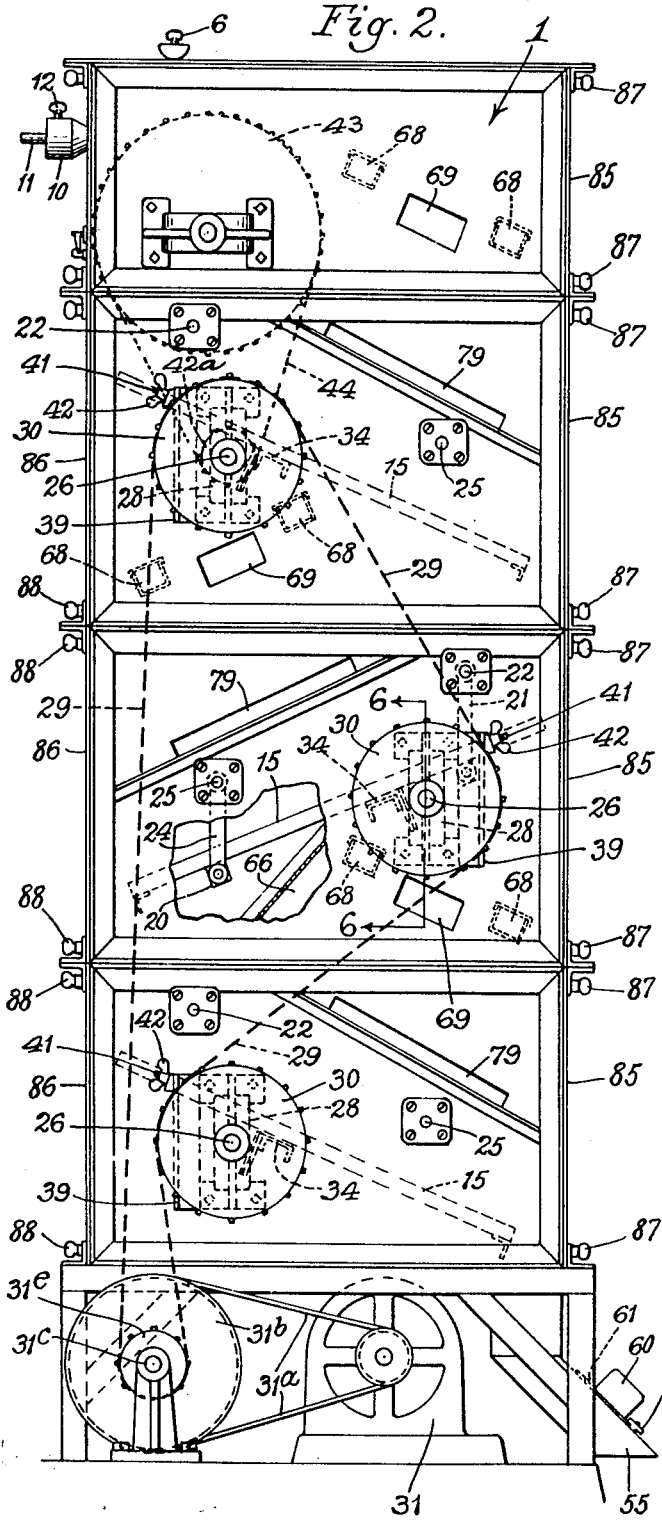
Fig. 2 is an end elevation of the device shown in Fig. 1 as seen from the left end.

One of the purposes of having the glass members 67 surrounded by the frame lined with asbestos is to secure an air-tight arrangement so that none of this dust can get into the lamp receptacles 66. Some means is provided for removing this moisture and dust. As herein shown, each chamber 78 is provided with an air-inlet 79 and an air outlet 80 (Figs. 2 and 4). The air outlet is connected by an exhaust conduit 81 with a suitable exhaust or air-moving device which removes the heated air, moisture and dust. In addition to the reasons heretofore set out, it is necessary to remove the heated air so that the material passing through the device will not become heated a sufficient amount to injure it. We prefer to hold the temperature of this material to between 100 degrees and 120 degrees Fahrenheit.

Figure 11:
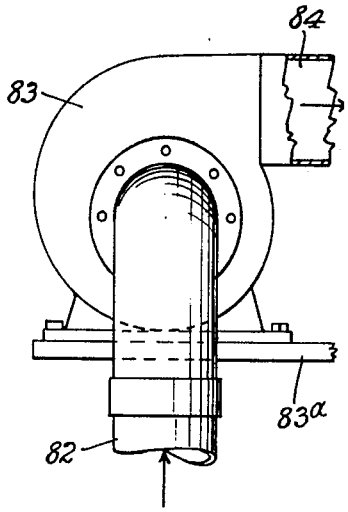
Fig. 11 is a view of the upper end of the conduit through which the moisture and heat are withdrawn from the housing, showing the air moving device connected therewith.

The exhaust conduits 72 and 81 may lead to any desired point. As herein shown, they are connected to a conduit 82 (Fig. 1) which is connected to an air-moving device 83 (Fig. 11) which discharges it into a conduit 84. It can then be disposed of in any desired manner. The exhaust conduits 72 are each provided with a damper or valve 72a and the exhaust conduits 81 are each provided with a damper or valve 81a. These valves may be maintained in any desired position so as to adjust or vary the effective size of the conduits and thereby control the speed of withdrawal of the heat, moisture and dust from the housing. By connecting the exhaust conduits 72 and 81 with the conduit 82, some of the dust will remain in the conduit and settle to the bottom. There is a removable bottom 85a by means of which this dust may be removed and saved.

The housing may be of any desired form and of any desired material. It is preferably made of sheet metal sections connected together by angle connections or by any other manner, and has removable doors 85 at the front and 86 in the back. These doors are held in position by the holding devices 87 and 88. By means of these doors access can be easily and quickly secured to any of the apparatus on the inside of the housing. The doors and the sections of the housing are preferably provided at their edges with a suitable packing 89 so as to provide a tight housing and prevent the leaking or admission of air into the housing except as it comes in through the inlet openings 69 and 79 in response to the air-moving device.

The member 67 is referred to as a glass member but it is, of course, evident that it may be of any other suitable material, transparent or translucent, which transmits infra-red rays.

The use and operation of our invention are as follows:

The germ to be treated by the apparatus may be separated from the crushed wheat in any desired manner. We prefer to take what is known as germ middlings for treatment, although we do not limit ourselves to treating such germ middlings.

The material to be treated is delivered to the hopper 2. The motor is operated so as to rotate the feed roll 3. The material then passes out through the space between the member 4 and the feed roll to the hopper 13 and out of this hopper onto the corrugated agitating member 15 and travels from one agitating member 15 to the other, and is finally discharged from the apparatus through the spouts 54 and 55 into any suitable receptacle or storage device. These agitating members are vibrated or rocked by means of the flat-faced wheels 32 33 engaging the engaging members 35 so as to cause the agitating members to be reciprocated, the springs 37 maintaining the engaging devices in connection with the flat-faced wheels. This causes the material to gradually pass along the agitating devices.

The infra-red lamps are in operation and they direct the rays upon this material as it passes along the corrugated agitating devices so as to dry the germs. These germs, after they are dried, are reduced to flour and by being thus dried and treated by the infra-red lamps, will pulverize and not flake during the grinding operation.

When treated as herein set out, the oil of the wheat germs has moisture removed therefrom so as to change the character and condition of the germs from an adhering mass, the particles of which adhere to form flattened pieces when the germs are passed through the rolls, to a friable condition where the particles are reduced to a powder when passed through the rolls, and may be returned to the flour so as to become a part of the flour from which the bread is made. The length of time during which the material is exposed to the lamps may be varied by speeding up or slowing down the vibrations of the agitating members by speeding up or slowing down the rotation of the flat-faced wheels 32. It is, of course, evident that any number of the agitating members or lamps may be used and where a few of them only are used, the material may be passed through the apparatus a plurality of times, if necessary to get the desired results. It may be desirable also to pass the treated material through the crushing rollers a plurality of times.

Heated air is removed from the lamp receptacle 66 through the exhaust coduit 72, and the moisture, heated air and dust are removed from the chamber 78 through the exhaust conduit 81, and are directed by the air-moving device into the conduit 84 and may be then directed to any point desired. By regulating the valves 72a and 81a the temperature of the material on the agitating members may be varied as required to secure the desired result. The dust taken from the chamber 78 may be added to the flour. The heat from the lamp receptacle and the chamber 78 may in the wintertime be used in heating the building or for other heating purposes.

When the germ middlings are treated, as herein described, they become of a lighter color. By treating the wheat germs, as herein set out, substantially all of the germs thus treated are recovered so as to become a part of the flour. By the use of this device the flour mills can produce uniform flour during all weather conditions. The action of the present device also improves the color of the material acted upon.

We have described in detail a particular construction for apparatus for treating the germs of wheat, either separate from or as a part of the middlings, but it is, of course, evident that the apparatus may be varied greatly in form, construction and arrangement without departing from the spirit of invention as embodied in the claims hereto appended and we, therefore, do not limit ourselves to the particular construction shown.

We claim:

1. An apparatus for treating wheat germs comprising a housing, an agitating member movably mounted in said housing, means for delivering the wheat germ to said agitating member, a vibrating member for vibrating said agitating member, an infra-red electric lamp above said agitating member and means for directing the rays therefrom upon the agitating member, a closed receptacle into which said infra-red lamp is received, and means for simultaneously removing and inserting air into the space above said agitating member, separate means for inserting into and removing air from the closed receptacle enclosing said infra-red lamp, and means for removing the wheat germs from said housing.

2. An apparatus for treating wheat germs comprising a housing, a wheat germ moving member mounted in said housing, means for delivering wheat germs to said member, an infra-red electric lamp above said member and means for directing the rays from said lamp upon said member and upon the wheat germs thereon, a closed receptacle in which said lamp is housed, including a wall, pervious to infra-red radiation, between said infra-red lamp and said member, means for simultaneously moving air through said closed receptacle and over the wheat germs on said member and means for moving the wheat germs from said housing.

3. An apparatus for treating wheat germs comprising a housing, a wheat germ moving member mounted in said housing, means for delivering wheat germs to said germ moving member, an infra-red electric lamp above said germ moving member and means for directing the rays therefrom upon the germ moving member, a partition, pervious to infra-red radiation, between said infra-red lamp and the germ moving member and means for simultaneously passing air on one side of said partition about said infra-red electric lamp and along the other side of said partition over the wheat germs on the germ moving member and for thereby cooling the lamp and removing dust and moisture from said zone of treatment.

4. An apparatus for treating wheat germs comprising a housing, a germ moving member movably mounted in said housing, and means for moving said germ moving member, means for delivering wheat germs to said germ moving member, an infra-red electric lamp and means for directing the rays therefrom upon the germs moving with said member, a closed receptacle in which said lamp is housed, said receptacle including a wall, pervious to infra-red rays, between said lamp and said germ moving member, means for simultaneously moving air through said closed receptacle, and over the germs on said germ moving member, and means for moving the wheat germs from said housing.

PAUL NAEHER.
MAURICE T. WILLIAMS.